United States Patent
Taghavi Nasrabadi et al.

(10) Patent No.: US 12,355,937 B1
(45) Date of Patent: Jul. 8, 2025

(54) EFFICIENT STEREO RENDERING

(71) Applicant: Apple Inc., Cupertino, CA (US)

(72) Inventors: Afshin Taghavi Nasrabadi, Los Gatos, CA (US); Michael Stecklein, Georgetown, TX (US); Maneli Noorkami, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 18/417,284

(22) Filed: Jan. 19, 2024

Related U.S. Application Data

(60) Provisional application No. 63/442,482, filed on Feb. 1, 2023.

(51) Int. Cl.
  *H04N 13/344* (2018.01)
  *H04N 13/128* (2018.01)

(52) U.S. Cl.
  CPC ......... *H04N 13/344* (2018.05); *H04N 13/128* (2018.05)

(58) Field of Classification Search
  CPC ........................... H04N 13/344; H04N 13/128
  USPC ........................................................ 348/51
  See application file for complete search history.

(56) References Cited

U.S. PATENT DOCUMENTS

| | | | |
|---|---|---|---|
| 2011/0018863 A1 | 1/2011 | Ha | |
| 2012/0050283 A1* | 3/2012 | Hwang | G06T 15/20 345/419 |
| 2013/0003128 A1* | 1/2013 | Watanabe | H04N 13/122 358/1.15 |
| 2013/0314501 A1* | 11/2013 | Davidson | H04N 13/122 348/46 |
| 2014/0210810 A1 | 7/2014 | Davidson et al. | |
| 2016/0219267 A1 | 7/2016 | Chu et al. | |
| 2016/0328879 A1* | 11/2016 | Jin | H04N 13/15 |
| 2016/0360177 A1* | 12/2016 | Graziosi | G06T 15/00 |
| 2017/0111633 A1* | 4/2017 | Kang | H04N 13/317 |
| 2017/0295353 A1* | 10/2017 | Hwang | H04N 13/344 |
| 2017/0330369 A1* | 11/2017 | Niemelä | G06T 15/503 |
| 2019/0028698 A1* | 1/2019 | Lin | H04N 13/315 |
| 2020/0053337 A1* | 2/2020 | Kikukawa | H04N 13/366 |
| 2021/0306613 A1* | 9/2021 | Howson | H04N 13/106 |
| 2022/0232201 A1 | 7/2022 | Cappello et al. | |
| 2023/0134779 A1* | 5/2023 | Reinert | G06T 15/20 345/420 |
| 2025/0071255 A1* | 2/2025 | Wilson | H04N 13/366 |

* cited by examiner

*Primary Examiner* — Tung T Vo
(74) *Attorney, Agent, or Firm* — Thompson Hine LLP

(57) ABSTRACT

Various implementations disclosed herein include devices, systems, and methods that generates a stereo view of a three-dimensional (3D) environment by rendering a first eye view and reusing pixels from the first eye view for a second eye view based on a disparity indicative characteristic (e.g., identifying regions of pixel difference/similarity in the views). For example, an example process may include rendering a first view for a first viewpoint (e.g., a left eye view) of a three-dimensional (3D) environment. The process may further include estimating differences between the first view and a second view for a second viewpoint (e.g., a right eye view) of the 3D environment. The process may further include rendering the second view for the second viewpoint based on the estimated differences.

21 Claims, 7 Drawing Sheets

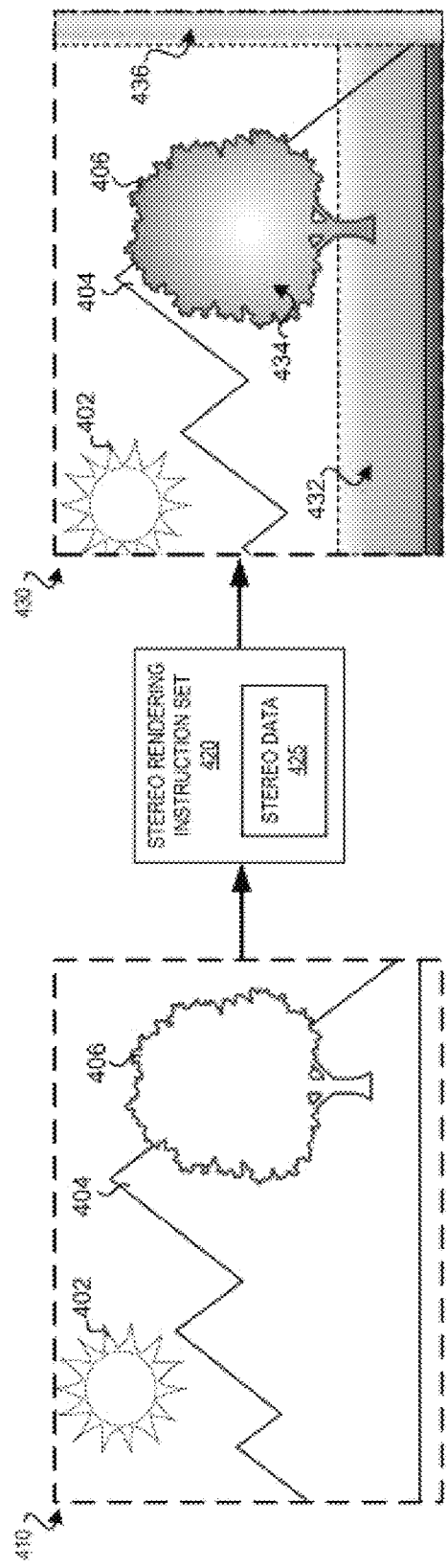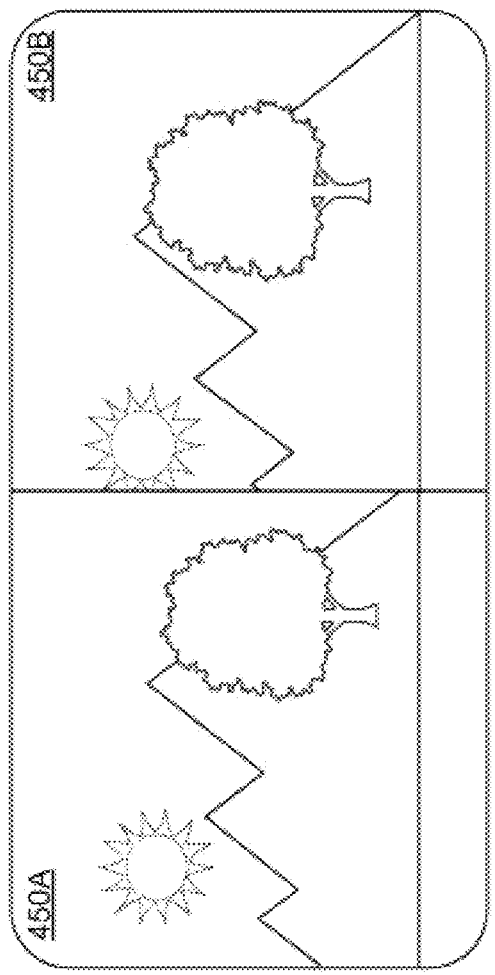
FIG. 4A
FIG. 4B

EFFICIENT STEREO RENDERING

CROSS-REFERENCE TO RELATED APPLICATIONS

This Application claims the benefit of U.S. Provisional Application Ser. No. 63/442,482 filed Feb. 1, 2023, which is incorporated herein in its entirety.

TECHNICAL FIELD

The present disclosure generally relates to techniques for providing content with electronic devices including systems, methods, and devices for efficiently rendering a stereo view of a three-dimensional environment.

BACKGROUND

For head mounted displays (HMDs), a virtual reality or mixed reality scene may be rendered on dedicated displays for each eye. Each display may depict a scene from a different point of view corresponding to the viewer's eyes position. This requires rendering a scene twice (e.g., rendering a left eye view and rendering a right eye view). Moreover, depending on a scene complexity or a distance of objects to the viewer, rendered images may be different in each view, i.e., there may be disparity between the two views. For example, as the distance from the viewer increases, the stereo disparity between the two views decreases, and the objects may appear very similar in both left and right views, if they are inside each view's viewport. However, if the objects at the far distance are very complex to render, running the rendering process twice may be inefficient, since they appear similarly in both views, e.g., sky or mountains at the far distance. Thus, it may be desirable to provide a means of efficiently rendering stereo views when rendering a second viewpoint.

SUMMARY

Some implementations disclosed herein provide systems and methods for generating a stereo view of a three-dimensional (3D) environment by rendering a first eye view (e.g., a left eye view) and reusing pixels from the first eye view for a second eye view (e.g., a right eye view) based on a disparity indicative characteristic (e.g., identifying regions of pixel difference/similarity in the views). Disparity between portions of the views may be determined based on disparity indicative characteristics such as depth/distance of the depicted objects, scene complexity, material type, and/or view-dependent effects. For example, view-dependent effects may include specularity, reflections, transparency, etc. In generating the second eye view, areas with small or no disparity (e.g., background objects or portions of the scene that are far away, pixels beyond a certain depth, etc.), may be copied from the first view reducing the amount of 3D-to-2D rendering required to generate the second eye view.

In some implementations, generating the stereo view is based on identifying regions of pixel similarity in both left and right views, and reusing at least a portion of the rendered pixels for both views. In some implementations, where areas with small stereo disparity or parallax are identified, when the renderer renders a first viewpoint, the renderer may need to reproject the depth of the rendered view to the other viewpoint. For the pixels which are beyond a certain depth, the rendered values may be copied from the first view. In this way, the expensive color shading part may be avoided for one eye and reduced to writing the already rendered values from the first view. For areas without view dependent effects, the rerendering process may be applied for any area at any distance if there are no view-dependent effects, and if the area is not occluded in the first view. For example, consider an opaque plane with a high complexity rendering process without any view-dependent effects. This opaque plane may be shaded once, and the non-occluded pixels may be re-used in the second view. In this case, the renderer may reproject one view to the other view, and for the regions that the reprojection process has high confidence, the already rendered pixels may be reused. The confidence is important, because reprojection accuracy may decrease on edges or complex parts resulting in lower quality output. After the regions of interest are identified, the rendering process may create a stencil map for the other view and render only for the uncovered regions.

In general, one innovative aspect of the subject matter described in this specification may be embodied in methods, at an electronic device having a processor, that include the actions of rendering a first view for a first viewpoint of a three-dimensional (3D) environment, estimating differences between the first view and a second view for a second viewpoint of the 3D environment, and based on the estimated differences, rendering the second view for the second viewpoint.

These and other embodiments may each optionally include one or more of the following features.

In some aspects, estimating differences between the first view and the second view for the second viewpoint of the 3D environment is based on determining one or more disparity indicative characteristics for the one or more regions of the first view.

In some aspects, determining the one or more disparity indicative characteristics for the one or more regions of the first view is based on a material type of one or more objects identified within the first view of the 3D environment.

In some aspects, determining the one or more disparity indicative characteristics for the one or more regions of the first view is based on a view dependent effect of one or more objects identified within the first view of the 3D environment. In some aspects, the view dependent effect is based on at least one of specularity, reflectivity, or transparency.

In some aspects, determining the one or more disparity indicative characteristics for the one or more regions of the first view includes identifying one or more objects corresponding to each region of the one or more regions, determining a distance from the electronic device to each of the one or more objects, and determining a disparity indicative characteristic for the one or more regions corresponding to amounts of expected difference between the one or more regions of the first view and corresponding one or more regions of the potential rendering of the second view based on the determined distance from the electronic device to each of the one or more objects and a threshold.

In some aspects, estimating differences between the first view and the second view for the second viewpoint of the 3D environment is based on determining a scene understanding of the 3D environment to identify one or more objects within each region of one or more regions of the first view.

In some aspects, rendering the second view for the second viewpoint is based on the scene understanding. In some aspects, rendering the second view for the second viewpoint includes identifying regions of interest of one or more regions of the first view, generating a stencil map corresponding to the second view, identifying covered regions and uncovered regions of the regions of interest, reusing the covered regions for the second view, and rendering the uncovered regions for the second view.

In some aspects, rendering the second view for the second viewpoint is based on rendering regions outside of the first viewpoint for the first view. In some aspects, rendering the second view for the second viewpoint is based on determining a subset of regions of the first view that comprise a depth value that is greater than a parallax threshold, wherein the second view that reuses at least the portion of the first view corresponds to the subset of regions.

In some aspects, the second view reuses at least a portion of the first view. In some aspects, the first viewpoint includes a first eye viewpoint, and the second viewpoint includes a second eye viewpoint.

In some aspects, the method further includes the actions of presenting a stereo view of the 3D environment comprising the first view for the first viewpoint and the second view for the second viewpoint.

In some aspects, the stereo view of the 3D environment is presented an extended reality (XR) environment.

In some aspects, the device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings.

FIGS. 4A and 4B illustrate an example of rendering a second view for a second viewpoint based on estimating differences between a first view and the second view in accordance with some implementations.

Figure 1:
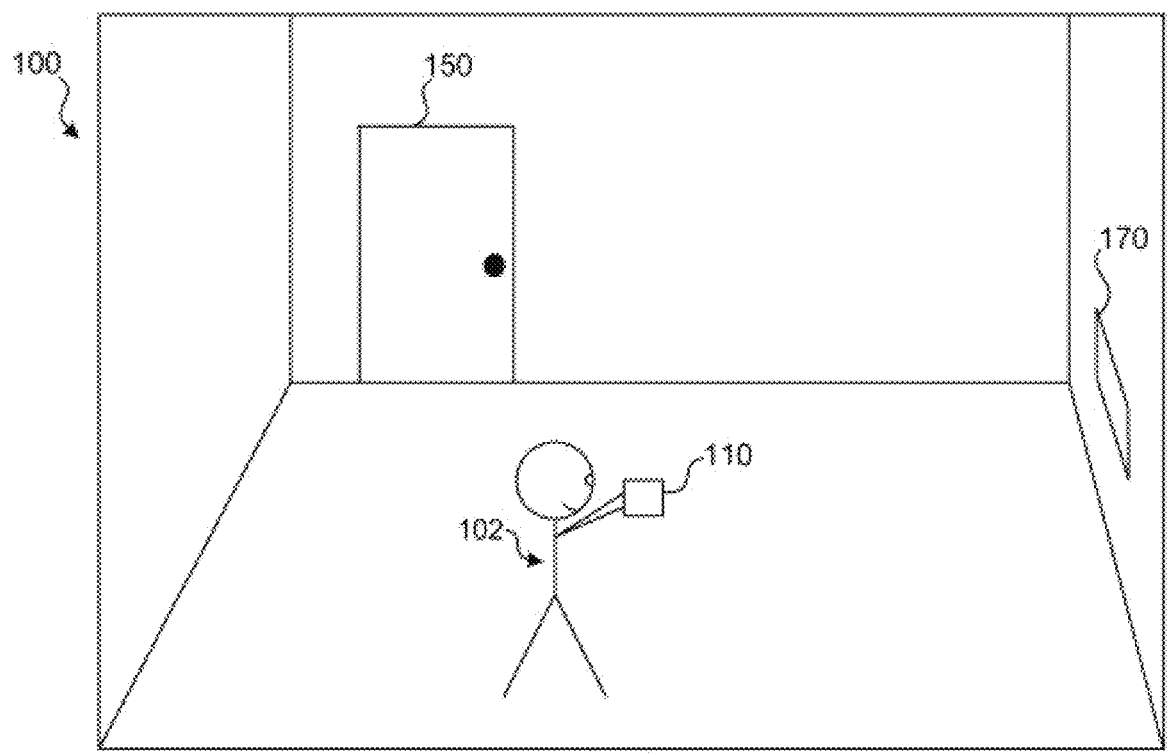
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100 in accordance with some implementations. The physical environment 100 includes a door 150 and a wall hanging 170. Additionally, physical environment 100 includes user 102 holding electronic device 110. The electronic device 110 includes one or more cameras or other sensors that may be used to capture or generate representations of the door 150, the wall hanging 170, and other objects of the physical environment 100. In some implementations, the device 110 is configured to present a computer-generated environment to the user 102. The presented environment may include extended reality (XR) features.

In some implementations, the device 110 is a handheld electronic device (e.g., a smartphone or a tablet). In some implementations, the device 110 is a near-eye device such as a head worn device. The device 110 utilizes one or more display elements to present views. For example, the device 110 may display views that include content in the context of an extended reality (XR) environment. In some implementations, the device 110 may enclose the angle-of-view of the user 102. In some implementations, the functionalities of device 110 are provided by more than one device. In some implementations, the device 110 communicates with a separate controller or server to manage and coordinate an experience for the user. Such a controller or server may be located in or may be remote relative to the physical environment 100.

Figure 2:
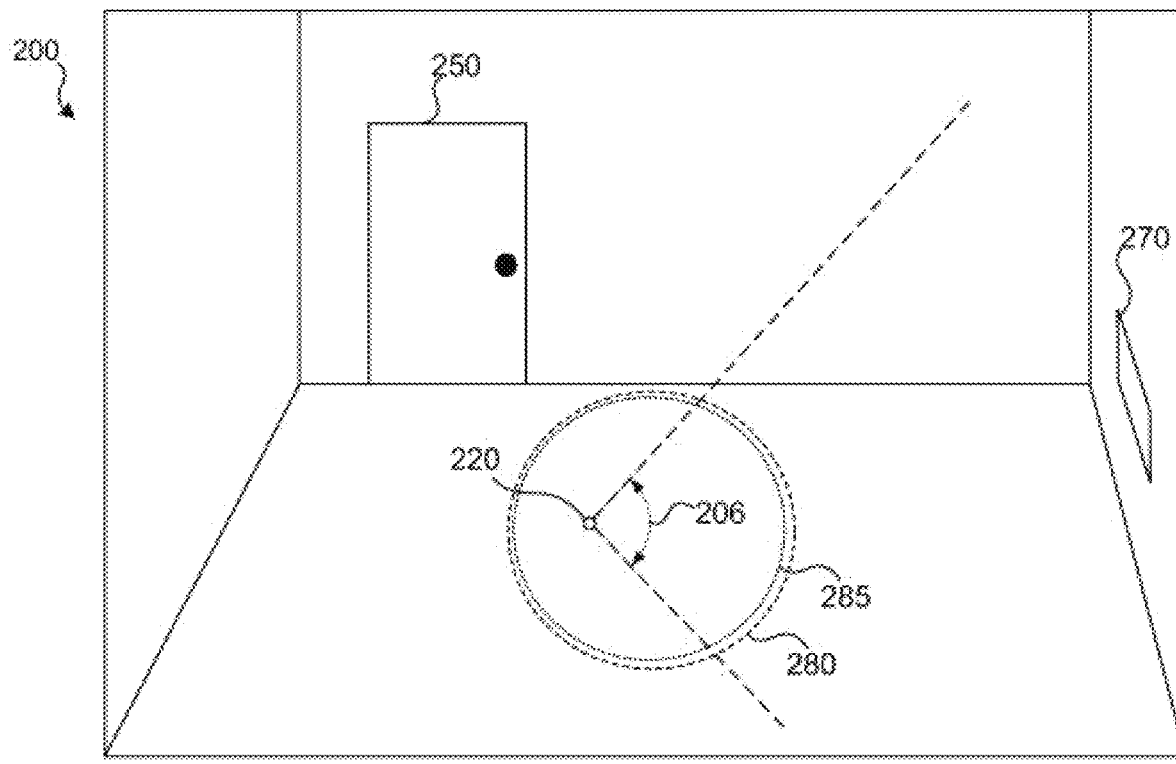
FIG. 2 illustrates an exemplary three-dimensional (3D) environment generated based on the physical environment of FIG. 1 and a projection of stereo image content within the 3D environment in accordance with some implementations.

FIG. 2 illustrates an exemplary three-dimensional (3D) environment 200 generated based on the physical environment 100 of FIG. 1 and a projection of image content within the 3D environment 200. The projection of a 3D image may also be referred to herein as a "portal". The 3D environment 200 includes representations 250 and 270 of the door 150 and wall hanging 170, respectively, of the physical environment 100. The 3D environment 200 also includes visual content 285 that is displayed to form a virtual shape 280

(e.g., a sphere that provides a view of image content such as 180°, 360°, surround videos, etc.). The visual content 285 being displayed to form the virtual shape 280 constitutes the portal (e.g., a projection of a stereo image), as discussed herein.

The electronic device 110 provides views of the 3D environment 200 that include depictions of the 3D environment from a viewer position 220 with a viewing angle 206, which in this example is determined based on the position of the electronic device 110 in the physical environment 100. Thus, as the user moves the electronic device 110 relative to the physical environment 100, the viewer position 220 corresponding the electronic device 110 position is moved relative to the 3D environment 200. The view of the 3D environment provided by the electronic device changes based on changes to the viewer position 220 relative to the 3D environment 200. In some implementations, the 3D environment 200 does not include representations of the physical environment 100, for example, including only virtual content corresponding to a virtual reality environment.

The visual content 285 may include a stereo image that may be one or more images, a video, an animation, or other visible content that is recorded or created. The visual content 285 may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-linear surface without adjustment. For example, the visual content 285 may be displayed on a portion of an inside or outside of an approximately spherical shape (which may be invisible). Non-linear visual content may be captured and displayed without distortion or adjustment that would otherwise be used to present the content on a planar surface. In some implementations, the visual content 285 may include a 180° stereo image pair or 180° stereo video content stored as equirectangular projections. In some implementations, spatialized depth data may also be obtained and used to enable a spatialized view.

In the example of FIGS. 1 and 2, the electronic device 110 is illustrated as a single, hand-held device. The electronic device 110 may be a mobile phone, a tablet, a laptop, so forth. In some implementations, electronic device 110 is worn by a user. For example, electronic device 110 may be a watch, a head-mounted device (HMD), head-worn device (glasses), headphones, an ear mounted device, and so forth. In some implementations, functions of the device 110 are accomplished via two or more devices, for example a mobile device and base station or a head mounted display and an ear mounted device. Various capabilities may be distributed amongst multiple devices, including, but not limited to, power capabilities, CPU capabilities, GPU capabilities, storage capabilities, memory capabilities, visual content display capabilities, audio content production capabilities, and the like. The multiple devices that may be used to accomplish the functions of electronic device 110 may communicate with one another via wired or wireless communications.

Figure 3:
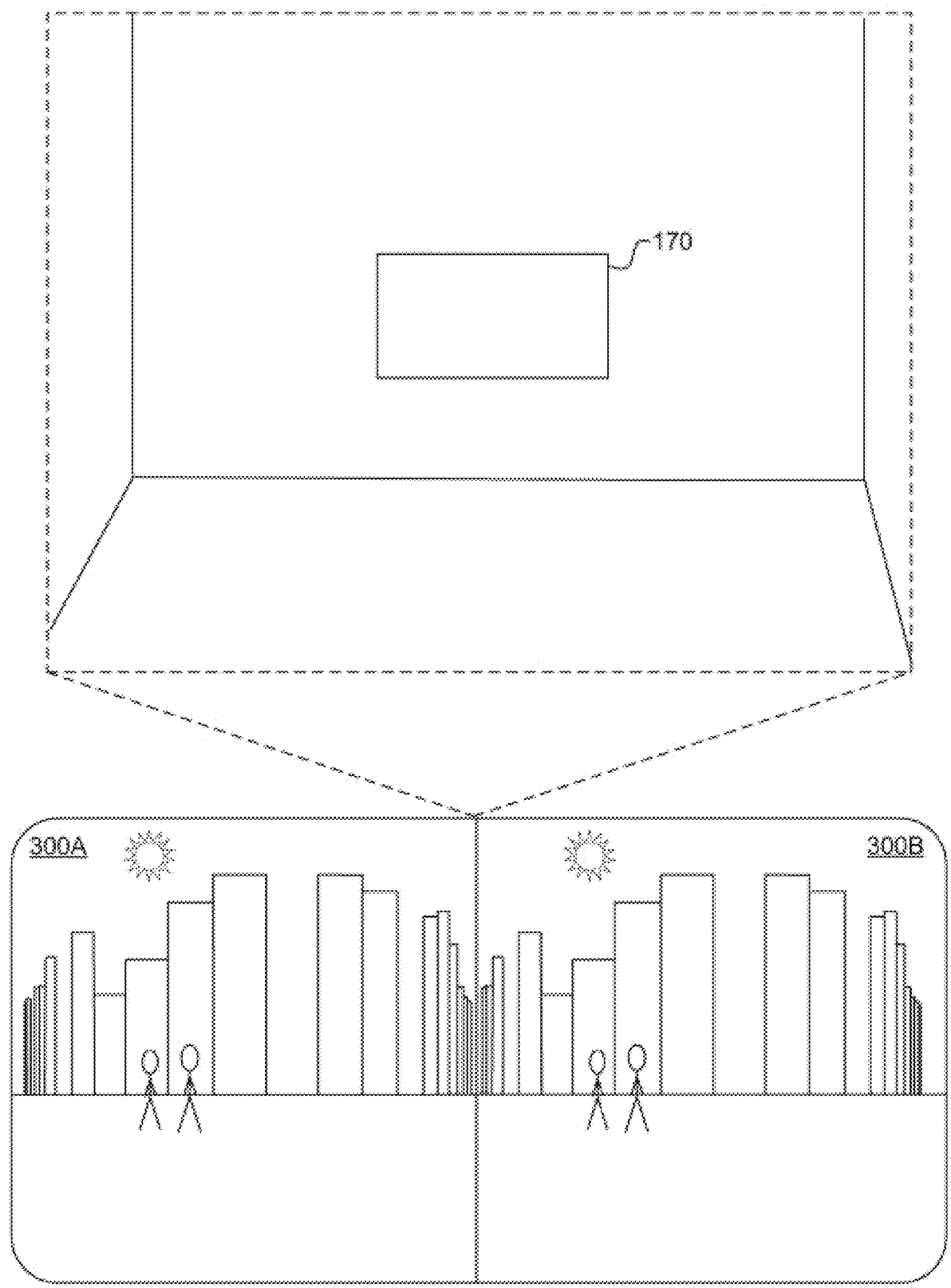
FIG. 3 illustrates example views of a 3D environment provided by the device of FIG. 2, the views including a left eye view and a right eye view in accordance with some implementations.

FIG. 3 illustrates example views 300A and 300B of a stereo view for device 110, where the views 300A and 300B include a left eye view and a right eye view, respectively, in accordance with some implementations. For example, the example view 300A represents an example left-eye viewpoint of the user 120 that he or she would be viewing in FIG. 1 of 3D image content (e.g., a photo of two people with a background of a city). The second view 300B represents an example right-eye viewpoint of the user 120 and is at a different location (compared to the first view 300A) based on the different viewpoint (e.g., pupillary distance with respect to the convergence of the user's gaze upon an object(s) of interest). Thus, if viewed on an HMD, the combination of example views 300A and 300B may be presented as a stereoscopic image to a user. Additionally, or alternatively, in some implementations, when a 3D scene or 3D environment is rendered on an HMD, the rendering may be a left image and a right image on the display. However, the scene itself may be comprised of different objects or entities such that each object or entity may have multiple meshes, materials, textures, and etc. Thus, the 3D scene is not necessarily limited to stereoscopic images.

FIGS. 4A and 4B illustrate an example of rendering a second view for a second viewpoint based on estimating differences between a first view and the second view in accordance with some implementations. In particular, FIG. 4A illustrates a process for obtaining first rendered image content 410 and generating second rendered image content 430 by the stereo rendering instruction set 420, utilizing one or more techniques for generating stereo views described herein. For example, first rendered image content 410 includes three objects, the sun 402, mountains 404, and a tree 406. The stereo rendering instruction set 420 may estimate differences between the first view (e.g., first rendered image content 410) and a second view for a second viewpoint (e.g., second rendered image content 430) of a 3D environment. For example, stereo rendering instruction set 420 may determine, based on depth data, that the tree 406, and a portion of the mountain 404 (e.g., as illustrated by area 432), are within a depth threshold, and therefore would need to be rerendered from the first rendered image content 410 for the second rendered image content 430. Additionally, stereo rendering instruction set 420 may determine that there are rendering regions outside of the first viewpoint for first rendered image content 410. For example, for areas that are determined to be outside of a left view, rerendering those identified areas for the second, right view (e.g., rerender the far-right column 436 for the view 450B).

FIG. 4B illustrates an example view of an electronic device (e.g., device 110). For example, the example view 400A represents an example left-eye viewpoint and view 400B represents an example left-eye viewpoint of the user 120 that he or she would be viewing for the rendered stereo data 425 (e.g., left eye image content, such as first rendered image content 410 and right-eye image content, such as second rendered image content 430).

Figure 5A:
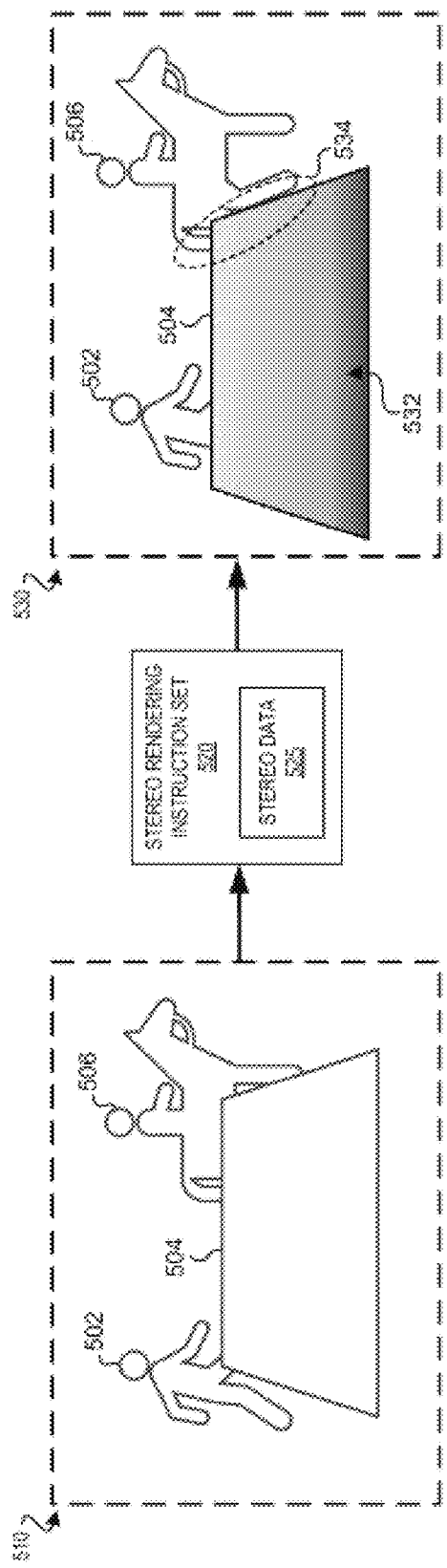
FIGS. 5A and 5B illustrate an example of rendering a second view for a second viewpoint based on estimating differences between a first view and the second view in accordance with some implementations.
Figure 5B:
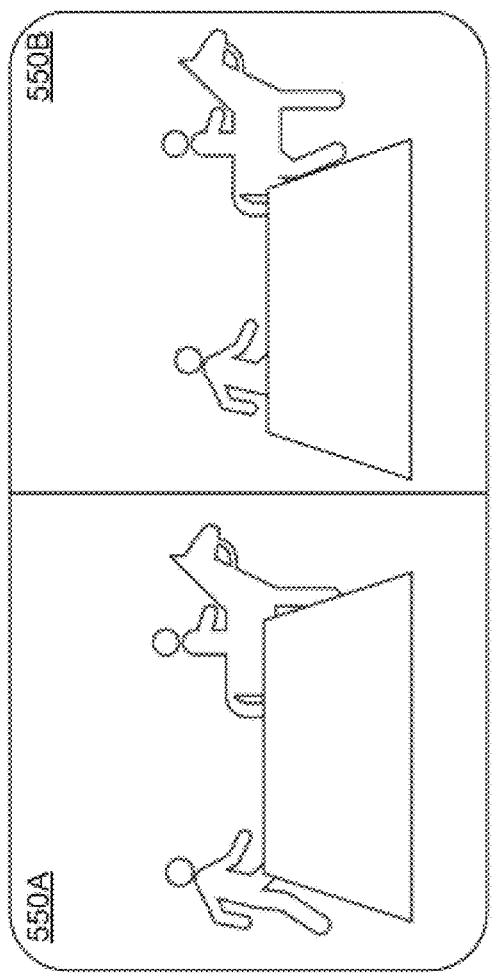

FIGS. 5A and 5B illustrate an example of rendering a second view for a second viewpoint based on estimating differences between a first view and the second view in accordance with some implementations. In particular, FIG. 5A illustrates a process for obtaining first rendered image content 510 and generating second rendered image content 530 by the stereo rendering instruction set 520, utilizing one or more techniques for generating stereo views described herein. For example, first rendered image content 510 includes three objects, a first person 502, table 504, and a second person riding a horse 506. The stereo rendering instruction set 520 may estimate differences between the first view (e.g., first rendered image content 510) and a second view for a second viewpoint (e.g., second rendered image content 530) of a 3D environment.

In some implementations, the stereo rendering instruction set 520 may look at disparity of objects in the scene and not rerender pixels that are the same or close to the same in the view. For example, stereo rendering instruction set 520 may determine, based on object classification techniques, that the first person 502, and the second person riding a horse 506, are particular type of objects (e.g., moving objects, complex objects, particular material, etc.), and therefore would need to be rerendered from the first rendered image content 510 for the second rendered image content 530. Additionally, or alternatively, in some implementations, stereo rendering instruction set 520 may determine a material type or view dependent effects (specularity, reflections, transparency, etc.) for each object, and based on the analysis, determine to rerender each specific object. For example, particular objects and/or materials may be preset to always be rerendered for the second view because of the complexities of that particular materials or object in order to generate a stereo view without any noticeable disparities to the user that may be created if the second view was copied from the first view (e.g., a transparent object may need to always be rerendered). Thus, at rendering time, the techniques described herein may classify each object to determine if that object has any view dependent effects to determine whether or not to apply the rerendering technique.

In some implementations, stereo rendering instruction set 520 may determine that there are partially occluded areas between two or more objects that may cause issues if reused for the second viewpoint. For example, for areas that are determined to be occluded (e.g., occlusion area 534 between table 504 and the second person riding a horse 506), rerendering those identified areas for the second, right view (e.g., rerender the occlusion area 534 including that portion of the table 504 for the view 550B).

FIG. 5B illustrates an example view of an electronic device (e.g., device 110). For example, the example view 550A represents an example left-eye viewpoint and view 550B represents an example right-eye viewpoint of the user 120 that he or she would be viewing for the rendered stereo data 525 (e.g., left eye image content, such as first rendered image content 510 and right-eye image content, such as second rendered image content 530).

In an exemplary implementation, the stereo rendering instruction sets 420 and 520 of FIGS. 4 and 5, respectively, may generate a stereo view based on identifying regions of pixel similarity in both left and right views, and reusing at least a portion of the rendered pixels for both views. In some implementations, where areas with small stereo disparity or parallax are identified, when the renderer renders a first viewpoint, the renderer may need to reproject the depth of the rendered view to the other viewpoint. For the pixels which are beyond a certain depth, the rendered values may be copied from the first view. In this way, for example, the expensive color shading part may be avoided for one eye and reduced to writing the already rendered values from the first view. For areas without view dependent effects, the rerendering process may be applied for any area at any distance if there are no view-dependent effects, and if the area is not occluded in the first view. For example, consider an opaque plane (e.g., table 504) with a high complexity rendering process without any view-dependent effects. This opaque plane may be shaded once, and the non-occluded pixels may be re-used in the second view. In this case, the renderer may reproject one view to the other view, and for the regions that the reprojection process has high confidence, the already rendered pixels may be reused. The confidence is important, because reprojection accuracy may decrease on edges or complex parts resulting in lower quality output. After the regions of interest are identified, the rendering process may create a stencil map for the other view and render only for the uncovered regions. An exemplary method/process for the stereo rendering instruction sets 420 and 520 is further described herein with reference to FIG. 6.

Figure 6:
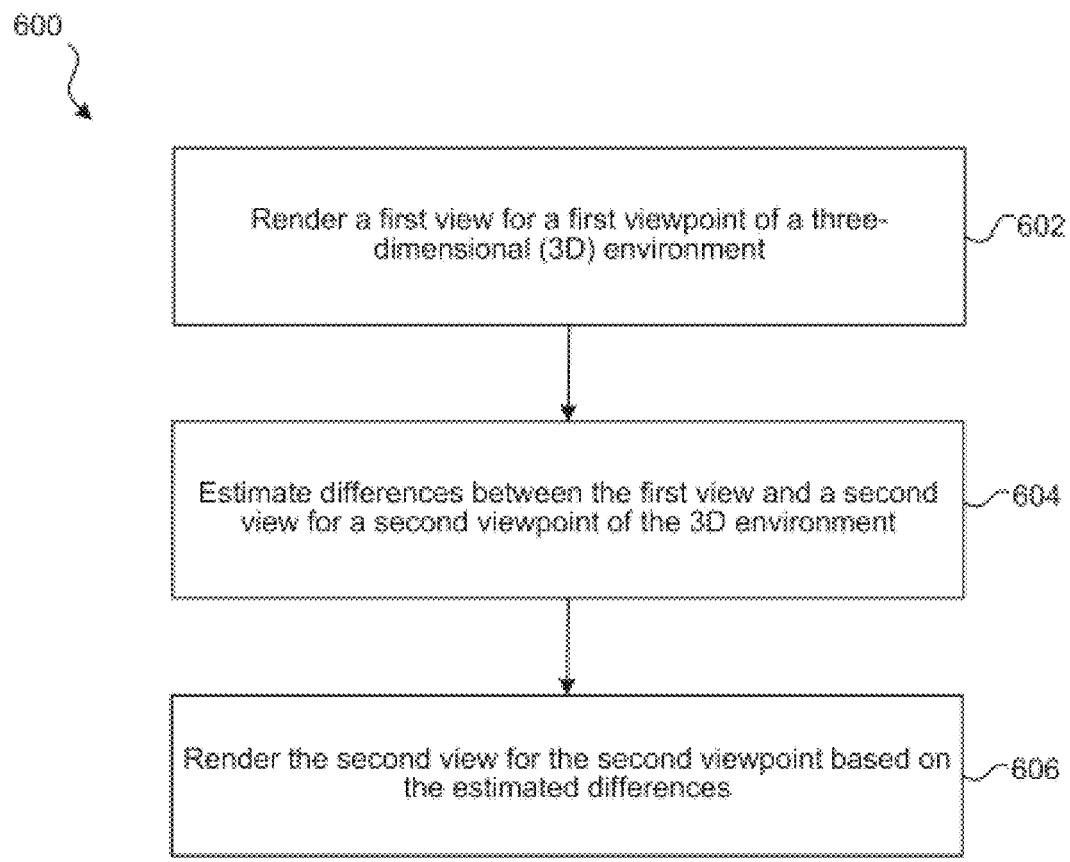
FIG. 6 is a flowchart representation of an exemplary method for rendering a second view for a second viewpoint based on estimating differences between a first view and the second view in accordance with some implementations.

FIG. 6 is a flowchart illustrating an exemplary method 600. In some implementations, a device such as electronic device 110 (FIG. 1) performs the techniques of method 600 to render a second view for a second viewpoint based on estimating differences between a first view and the second view according to some implementations. In some implementations, the techniques of method 600 are performed on a mobile device, desktop, laptop, HMD, ear-mounted device or server device. In some implementations, the method 600 is performed by processing logic, including hardware, firmware, software, or a combination thereof. In some implementations, the method 600 is performed on a processor executing code stored in a non-transitory computer-readable medium (e.g., a memory).

In some implementations, the method 600 generates a stereo view of a 3D environment by rendering a first eye view (e.g., a left eye view) and reusing pixels from the first eye view for a second eye view (e.g., a right eye view) based on a disparity indicative characteristic (e.g., identifying regions of pixel difference/similarity in the views). Disparity between portions of the views may be determined based on disparity indicative characteristics such as depth/distance of the depicted objects, scene complexity, material type, and/or view-dependent effects. For example, view-dependent effects may include specularity, reflections, transparency, etc. In generating the second eye view, areas with small or no disparity (e.g., background objects or portions of the scene that are far away, pixels beyond a certain depth, etc.), may be copied from the first view reducing the amount of 3D-to-2D rendering required to generate the second eye view.

At block 602, the method 600 renders a first view for a first viewpoint of a 3D environment. For example, at an electronic device that may display stereo views (e.g., an HMD), the method 600 first renders a first view for a first viewpoint (e.g., a left eye view). For example, the view of the 3D environment may include a 3D image that may be any stereo image pair, e.g., such that differences between a right eye view and a left eye view enable the viewer to perceive depth within the image content that is depicted. For example, the 3D image may be any type of stereo image pair such as 180° half sphere, rectilinear 90°, equirectangular projections, and the like, such that any image content with a known projection will work, as long as the content includes a stereo pair. In some implementations, the view of the 3D environment may include multiple 3D objects, and may more than 180° or 360° images. Additionally, each object may be made from multiple meshes, textures, materials, and the like.

At block 604, the method 600 estimates differences between the first view and a second view for a second viewpoint of the 3D environment. For example, at an electronic device that may display stereo views (e.g., an HMD), the method 600 determines a second viewpoint for a second view (e.g., a right eye view. In some implementations, estimating the differences between the two viewpoints may be dependent on the scene complexity (e.g., too many objects/occlusions), material type/view dependent effects (e.g., specularity, reflections, transparency, etc.), and/or the distance of objects to the viewer and based on a threshold. In some implementations, estimating the differences between the two viewpoints may utilize object detection and occlusion algorithms, such that any occluded area may be rerendered (e.g., area 534). In some implementations, for view dependent effects, there may be list of flagged elements within the 3D environment for particular material types that may be selected or removed for rerendering, and the selection process may be based on one or more object classification techniques.

In the following exemplary implementations, estimating differences between the first view and the second view for the second viewpoint of the 3D environment may be based on determining one or more disparity indicative characteristics for the one or more regions of the first view.

In some implementations, determining the one or more disparity indicative characteristics for the one or more regions of the first view is based on a material type of one or more objects identified within the first view of the 3D environment. In some implementations, determining the one or more disparity indicative characteristics for the one or more regions of the first view is based on a view dependent effect of one or more objects identified within the first view of the 3D environment. In some implementations, the view dependent effect is based on at least one of specularity, reflectivity, or transparency. For example, based on one or more object classification techniques, each object within the view of the 3D environment may be analyzed and classified as an object type and/or a material type. Based on the object classification techniques as an object type and/or a material type, for view dependent effects, there may be a list of flags for particular material types that the rendering methods described herein may or may not use to rerender. For example, particular objects and/or materials may be preset to always be rerendered for the second view because of the complexities of that particular materials or object in order to generate a stereo view without any noticeable disparities to the user that may be created if the second view was copied from the first view (e.g., a transparent object may need to always be rerendered). Thus, at rendering time, the techniques described herein may classify each object to determine if that object has any view dependent effects to determine whether or not to apply the rerendering technique.

In some implementations, determining the one or more disparity indicative characteristics for the one or more regions of the first view includes identifying one or more objects corresponding to each region of the one or more regions, determining a distance from the electronic device to each of the one or more objects, and determining a disparity indicative characteristic for the one or more regions corresponding to amounts of expected difference between the one or more regions of the first view and corresponding one or more regions of the potential rendering of the second view based on the determined distance from the electronic device to each of the one or more objects and a threshold. For example, determining the one or more disparity indicative characteristics for the one or more regions of the first view may be dependent on distance of objects to the viewer and based on a threshold distance. For example, as illustrated in FIG. 4A, the stereo rendering instruction set 420 may determine that the area 432 may need to be rerendered because the foreground is closer to the viewer, and the remaining portion (e.g., background objects) are to far and may not need to be rendered (e.g., objects at a far distance are very complex to render, running the rendering process twice is inefficient, so reusing the view for both viewpoints works well since they appear similarly in both views, e.g., sky or mountains at the far distance).

At block 606, the method 600 renders the second view for the second viewpoint based on the estimated differences. For example, at an electronic device that may display stereo views (e.g., an HMD), the method 600 renders a second view for a second viewpoint (e.g., a right eye view) to be combined with the first view for the first viewpoint (e.g., a left eye view). In some implementations, rendering the second view for the second viewpoint may be based on identifying regions of interest, creating a stencil map for the second view, and rendering only uncovered regions (e.g., look at disparity of objects in the scene and not rerender pixels that are the same or close to the same in the view). In some implementations, for areas outside of the left view, the method may rerender for right view (e.g., a far column), and for areas with small stereo disparity or parallax (e.g., background objects or portions of the scene that are far away, pixels beyond a certain depth, etc.), the rendered values for the second view may be copied from the first view.

Some implementations for generating a stereo view of a 3D environment are focused on a scene understanding and a scene complexity (e.g., too many objects/occlusions). In an exemplary implementation, estimating differences between the first view and the second view for the second viewpoint of the 3D environment is based on determining a scene understanding of the 3D environment to identify one or more objects within each region of one or more regions of the first view. In some implementations, rendering the second view for the second viewpoint is based on the scene understanding. For example, some techniques may determine whether there are too many objects/occlusions in the first viewpoint (left eye), and therefore determine to rerender the entire scene for the other viewpoint (right eye).

In some implementations, rendering the second view for the second viewpoint includes identifying regions of interest of one or more regions of the first view, generating a stencil map corresponding to the second view, identifying covered regions and uncovered regions of the regions of interest, reusing the covered regions for the second view, and rendering the uncovered regions for the second view. For example, some techniques for rendering stereo views may analyze disparity of objects in a scene and not rerender pixels that are the same or close to the same in the view, i.e., as the view gets farther away from areas/objects, such as the sky, the mountains, etc., those objects appear the same between the two views (e.g., sun 402 and the portion of the mountains 404 that are farther away than the area 432 of FIG. 4A).

In some implementations, rendering the second view for the second viewpoint is based on rendering regions outside of the first viewpoint for the first view. For example, for areas that determined to be outside of a left view, rerendering those identified areas for the second, right view (e.g., rerender the far-right column 436 for the view 450B).

In some implementations, rendering the second view for the second viewpoint is based on determining a subset of regions of the first view that include a depth value that is greater than a parallax threshold, and the second view that reuses at least the portion of the first view corresponds to the subset of regions. For example, for areas with small stereo disparity or parallax (e.g., background objects or portions of the scene that are far away, pixels beyond a certain depth, etc.), the rendered values for the second view should be copied from the first view.

In some implementations, the second view reuses at least a portion of the first view. In some implementations, the first viewpoint comprises a first eye viewpoint, and the second viewpoint comprises a second eye viewpoint.

In some implementations, the method 600 further includes presenting a stereo view of the 3D environment comprising the first view for the first viewpoint (left eye view) and the second view for the second viewpoint (right eye view). In some implementations, the stereo view of the 3D environment is presented an extended reality (XR) environment. In some implementations, the device is a head-mounted device (HMD).

The image content associated with the rendering and rerendering for the two views of the 3D environment may be one or more images, a video, an animation, or other visible content that is recorded or created, including, but not limited to, 180°, 360°, spherical, and/or surround video content, or the like. The image content may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-linear surface without adjustment. For example, the content may be displayed on a portion of an inside or outside of an approximately spherical shape (which may be invisible). Non-linear visual content may be captured and displayed without distortion or adjustment that would otherwise be used to present the content on a planar surface.

In some implementations, the image content associated with the 3D environment includes a stereoscopic image pair including left eye content corresponding to a left eye viewpoint and right eye content corresponding to a right eye viewpoint. In some implementations, the image content may include a stereo image pair or stereo video content (e.g., 180° stereo image content) stored as equirectangular projections. For example, as illustrated in FIG. 3, a stereo image pair of 3D images is displayed to the user (e.g., view 300B is a left-eye view and view 300B is a right-eye view). In some implementations, spatialized depth data may also be obtained and used to enable a spatialized view. In some implementations, the 3D image includes a stereo photograph, a stereogram, flickering stereo images, a random dot stereogram, an anaglyph, a lenticular image, or the like. In some implementations, the 3D image may be any stereo image pair, e.g., such that differences between a right eye view and a left eye view enable the viewer to perceive depth within the image content that is depicted at the portal. For example, the spherical image content may be any type of stereo image pair such as 180° half sphere, rectilinear 90°, equirectangular projections, and the like, such that any image content with a known projection will work, as long as the content includes a stereo pair.

In some implementations, the method 600 further includes adjusting a projection of a stereo view of the 3D environment to reduce pixel disparity between the left and right eye viewpoints. For example, a convergence angle between the left eye viewpoint and the right eye viewpoint may be determined based on a user's gaze. The convergence angles may be determined based on a three-point triangle of a user's position, a projected 3D point of a pixel on an object for a left eye, and a projected 3D point of a pixel on an object for a right eye. As the two projected 3D points for the left and right eye view moves, the angle may become smaller or larger. The object may include the 3D image projection (e.g., a half-sphere), or the object may include a particular object within the projection of the 3D image that the user is focused on (e.g., a person).

Figure 7:
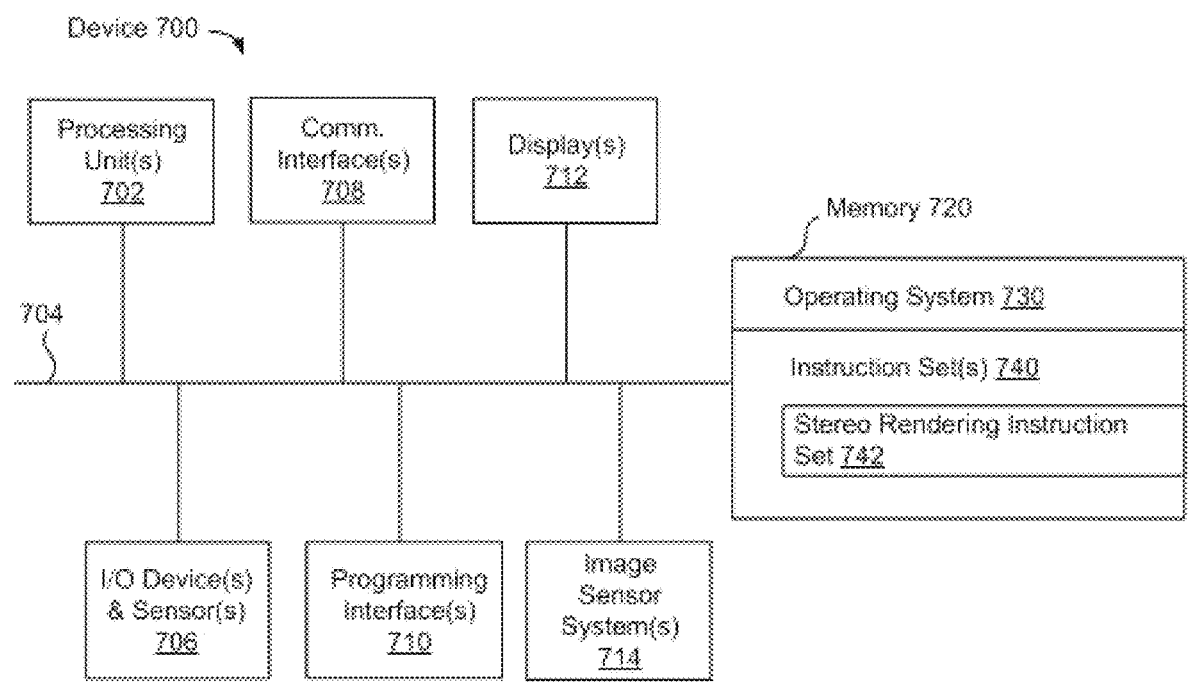
FIG. 7 is an example device in accordance with some implementations.

FIG. 7 is a block diagram of an example device 700. Device 700 illustrates an exemplary device configuration for an electronic device (e.g., device 110). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 700 includes a single display. In another example, the device 700 includes a display for each eye of the user (e.g., an HMD).

In some implementations, the one or more image sensor systems 714 are configured to obtain image data that corresponds to at least a portion of the physical environment 100. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include a 3D representation instruction set 742, content instruction set 744, communication session instruction set 746, and a scene understanding instruction set 748. The instruction set(s) 740 may be embodied a single software executable or multiple software executables.

In some implementations, the 3D representation instruction set 742 is executable by the processing unit(s) 702 to generate 3D representation data (e.g., depth map, 3D point cloud, semantically labeled, etc.). For example, the 3D representation instruction set 742 obtains sensor data of a physical environment (e.g., physical environment 100 of FIG. 1) and generates 3D representation data (e.g., a 3D mesh representation, a 3D point cloud with associated semantic labels, or the like) using techniques described herein.

In some implementations, the content instruction set 744 is executable by the processing unit(s) 702 to provide and/or track content for display on a device. The content instruction set 744 may be configured to monitor and track the content over time (e.g., while viewing an XR environment), and generate and display virtual content. To these ends, in various implementations, the instruction includes instructions and/or logic therefor, and heuristics and metadata therefor.

In some implementations, the communication session instruction set 746 is executable by the processing unit(s) 702 to execute a communication session between two or more devices using one or more techniques. For example, a communication session may involve representations of either or both users that are positioned within any entirely virtual environment or an XR environment that includes some physical environment representations and some virtual environment representations. To these ends, in various implementations, the instruction includes instructions and/or logic therefor, and heuristics and metadata therefor.

In some implementations, the scene understanding instruction set 748 is executable by the processing unit(s) 702 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 8:
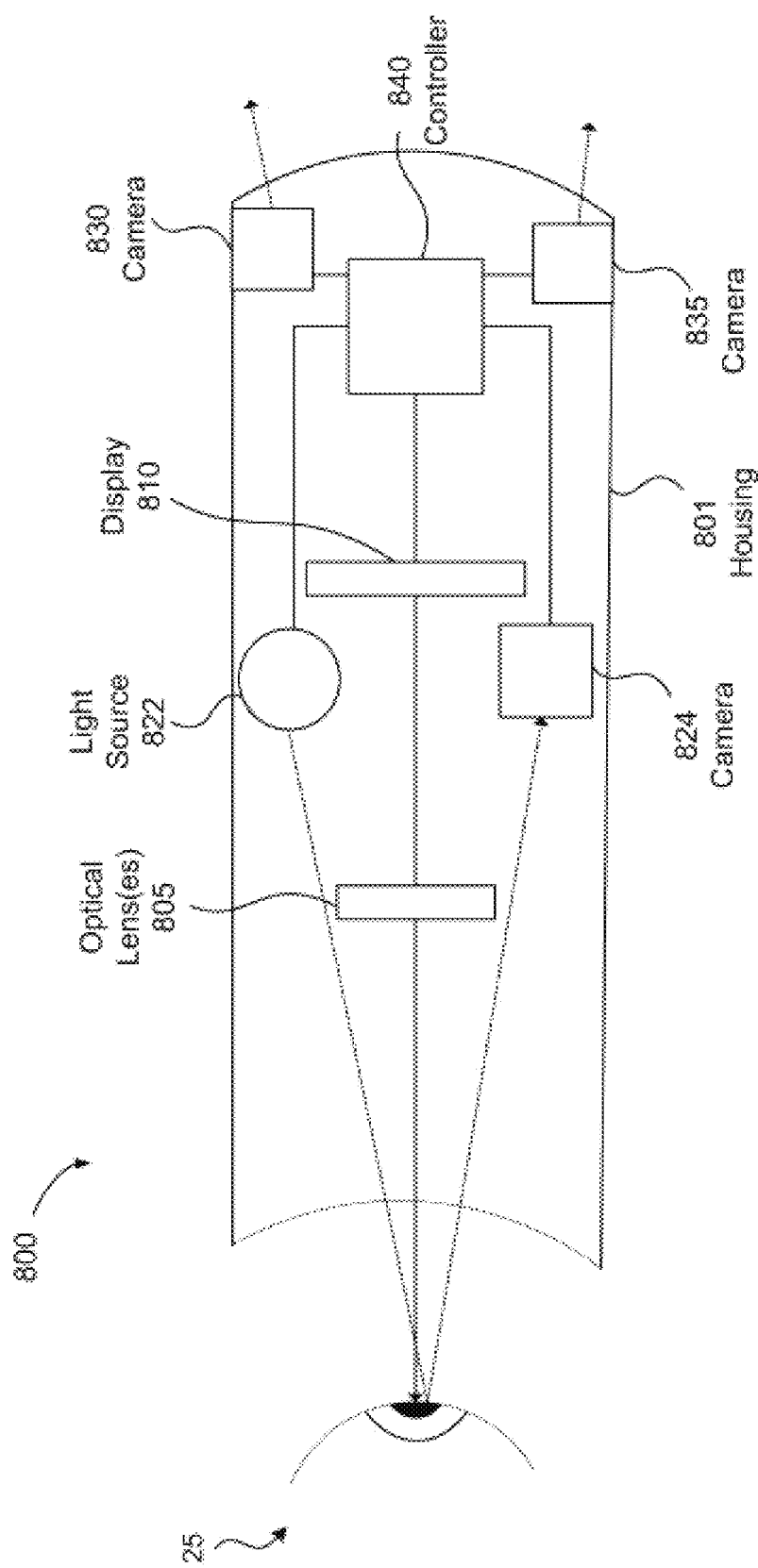
FIG. 8 illustrates an example head-mounted device (HMD) in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user 102) end of the housing 801. In various implementations, the eye pad is a plastic or rubber piece that comfortably and snugly keeps the head-mounted device 800 in the proper position on the face of the user 102 (e.g., surrounding the eye of the user 102).

The housing 801 houses a display 810 that displays an image, emitting light towards or onto the eye of a user 102. In various implementations, the display 810 emits the light through an eyepiece having one or more optical elements 805 that refracts the light emitted by the display 810, making the display appear to the user 102 to be at a virtual distance farther than the actual distance from the eye to the display 810. For example, optical element(s) 805 may include one or more lenses, a waveguide, other diffraction optical elements (DOE), and the like. For the user 102 to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, camera 832, camera 834, camera 836, and a controller 880. The one or more light sources 822 emit light onto the eye of the user 102 that reflects as a light pattern (e.g., a circle of glints) that may be detected by the camera 824. Based on the light pattern, the controller 880 may determine an eye tracking characteristic of the user 102. For example, the controller 880 may determine a gaze direction and/or a blinking state (eyes open or eyes closed) of the user 102. As another example, the controller 880 may determine a pupil center, a pupil size, or a point of regard. Thus, in various implementations, the light is emitted by the one or more light sources 822, reflects off the eye of the user 102, and is detected by the camera 824. In various implementations, the light from the eye of the user 102 is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 810 by looking at it), provide foveated rendering (e.g., present a higher resolution in an area of the display 810 the user 102 is looking at and a lower resolution elsewhere on the display 810), or correct distortions (e.g., for images to be provided on the display 810).

In various implementations, the one or more light sources 822 emit light towards the eye of the user 102 which reflects in the form of a plurality of glints.

In various implementations, the camera 824 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 824 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 832, camera 834, and camera 836 are frame/shutter-based cameras that, at a particular point in time or multiple points in time at a frame rate, may generate an image of the face of the user 102 or capture an external physical environment. For example, camera 832 captures images of the user's face below the eyes, camera 834 captures images of the user's face above the eyes, and camera 836 captures the external environment of the user (e.g., environment 100 of FIG. 1). The images captured by camera 832, camera 834, and camera 836 may include light intensity images (e.g., RGB) and/or depth image data (e.g., Time-of-Flight, infrared, etc.).

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions, encoded on computer storage medium for execution by, or to control the operation of, data processing apparatus. Alternatively, or additionally, the program instructions may be encoded on an artificially generated propagated signal, e.g., a machine-generated electrical, optical, or electromagnetic signal, that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above may be varied for example, blocks may be re-ordered, combined, and/or broken into sub-blocks. Certain blocks or processes may be performed in parallel. The operations described in this specification may be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device having a processor:
rendering a first view for a first viewpoint of a three-dimensional (3D) environment;
estimating differences between the first view and a second view for a second viewpoint of the 3D environment based on determining one or more disparity indicative characteristics for one or more regions of the first view, wherein determining the one or more disparity indicative characteristics for the one or more regions of the first view comprises:
identifying one or more objects corresponding to each region of the one or more regions;
determining a distance from the electronic device to each of the one or more objects; and
determining a disparity indicative characteristic for the one or more regions corresponding to amounts of expected difference between the one or more regions of the first view and corresponding one or more regions of a potential rendering of the second view based on the determined distance from the electronic device to each of the one or more objects and a threshold; and
based on the estimated differences, rendering the second view for the second viewpoint.

2. The method of claim 1, wherein determining the one or more disparity indicative characteristics for the one or more regions of the first view is based on a material type of one or more objects identified within the first view of the 3D environment.

3. The method of claim 1, wherein determining the one or more disparity indicative characteristics for the one or more regions of the first view is based on a view dependent effect of one or more objects identified within the first view of the 3D environment.

4. The method of claim 3, wherein the view dependent effect is based on at least one of:
specularity,
reflectivity, or
transparency.

5. The method of claim 1, wherein estimating differences between the first view and the second view for the second viewpoint of the 3D environment is based on determining a scene understanding of the 3D environment to identify one or more objects within each region of one or more regions of the first view.

6. The method of claim 5, wherein rendering the second view for the second viewpoint is based on the scene understanding.

7. The method of claim 1, wherein rendering the second view for the second viewpoint is based on rendering regions outside of the first viewpoint for the first view.

8. The method of claim 1, wherein rendering the second view for the second viewpoint is based on determining a subset of regions of the first view that comprise a depth value that is greater than a parallax threshold, wherein the second view that reuses at least a portion of the first view corresponds to the subset of regions.

9. The method of claim 1, wherein the second view reuses at least a portion of the first view.

10. The method of claim 1, wherein the first viewpoint comprises a first eye viewpoint, and the second viewpoint comprises a second eye viewpoint.

11. The method of claim 1, further comprising:
presenting a stereo view of the 3D environment comprising the first view for the first viewpoint and the second view for the second viewpoint.

12. The method of claim 11, wherein the stereo view of the 3D environment is presented an extended reality (XR) environment.

13. The method of claim 1, wherein the device is a head-mounted device (HMD).

14. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
rendering a first view for a first viewpoint of a three-dimensional (3D) environment;
estimating differences between the first view and a second view for a second viewpoint of the 3D environment based on determining one or more disparity indicative characteristics for one or more regions of the first view, wherein determining the one or more disparity indicative characteristics for the one or more regions of the first view comprises:
identifying one or more objects corresponding to each region of the one or more regions;
determining a distance from the device to each of the one or more objects; and
determining a disparity indicative characteristic for the one or more regions corresponding to amounts of expected difference between the one or more regions of the first view and corresponding one or more regions of a potential rendering of the second view based on the determined distance from the device to each of the one or more objects and a threshold; and
based on the estimated differences, rendering the second view for the second viewpoint.

15. The device of claim 14, wherein determining the one or more disparity indicative characteristics for the one or more regions of the first view is based on a material type of one or more objects identified within the first view of the 3D environment.

16. The device of claim 14, wherein determining the one or more disparity indicative characteristics for the one or more regions of the first view is based on a view dependent effect of one or more objects identified within the first view of the 3D environment.

17. The device of claim 16, wherein the view dependent effect is based on at least one of:
specularity,
reflectivity, or
transparency.

18. The device of claim 14, wherein estimating differences between the first view and the second view for the second viewpoint of the 3D environment is based on determining a scene understanding of the 3D environment to identify one or more objects within each region of one or more regions of the first view.

19. The device of claim 18, wherein rendering the second view for the second viewpoint is based on the scene understanding.

20. A non-transitory computer-readable storage medium, storing program instructions executable on a device including one or more processors to perform operations comprising:
rendering a first view for a first viewpoint of a three-dimensional (3D) environment;
estimating differences between the first view and a second view for a second viewpoint of the 3D environment based on determining one or more disparity indicative characteristics for one or more regions of the first view, wherein determining the one or more disparity indicative characteristics for the one or more regions of the first view comprises:
identifying one or more objects corresponding to each region of the one or more regions;
determining a distance from the device to each of the one or more objects; and
determining a disparity indicative characteristic for the one or more regions corresponding to amounts of expected difference between the one or more regions of the first view and corresponding one or more regions of a potential rendering of the second view based on the determined distance from the device to each of the one or more objects and a threshold; and
based on the estimated differences, rendering the second view for the second viewpoint.

21. A method comprising:
at an electronic device having a processor:
rendering a first view for a first viewpoint of a three-dimensional (3D) environment;
estimating differences between the first view and a second view for a second viewpoint of the 3D environment; and
based on the estimated differences, rendering the second view for the second viewpoint, wherein rendering the second view for the second viewpoint comprises:
identifying regions of interest of one or more regions of the first view;
generating a stencil map corresponding to the second view;
identifying covered regions and uncovered regions of the regions of interest;
reusing the covered regions for the second view; and
rendering the uncovered regions for the second view.

* * * * *

UNITED STATES PATENT AND TRADEMARK OFFICE
CERTIFICATE OF CORRECTION

Page 1 of 1

PATENT NO. : 12,355,937 B1
APPLICATION NO. : 18/417284
DATED : July 8, 2025
INVENTOR(S) : Afshin Taghavi Nasrabadi, Michael Stecklein and Maneli Noorkami It is certified that error appears in the above-identified patent and that said Letters Patent is hereby corrected as shown below:

In the Claims

Claim 12, Column 19, Line 9, reads:
"...is presented an extended reality..."
Should read:
--...is presented within an extended reality...--

Signed and Sealed this
Fourteenth Day of October, 2025

John A. Squires
*Director of the United States Patent and Trademark Office*